Nov. 14, 1967

N. TYLER 3,352,521

UNIVERSAL MOUNT

Filed Jan. 21, 1966

INVENTOR.
NELSON TYLER

BY Fulwider, Patton, Rieber,
Lee and Utecht
ATTORNEYS

Nov. 14, 1967          N. TYLER          3,352,521

UNIVERSAL MOUNT

Filed Jan. 21, 1966          5 Sheets-Sheet 2

INVENTOR.
NELSON TYLER

BY Fulwider, Patton, Rieber,
Lee and Utecht
ATTORNEYS

INVENTOR.
NELSON TYLER
BY Fulwider, Patton, Rieber,
Lee and Utecht
ATTORNEYS

3,352,521
UNIVERSAL MOUNT
Nelson Tyler, Van Nuys, Calif., assignor to NTT Enterprises, Inc., Hollywood, Calif., a corporation of California
Filed Jan. 21, 1966, Ser. No. 522,104
25 Claims. (Cl. 248—123)

ABSTRACT OF THE DISCLOSURE

A universal mount for continuous aiming of an instrument such as a camera at a target object which is moving relative to the mount, and wherein the masses of the camera and the mount are precisely balanced about the various axes of movement of the camera.

---

The present invention relates to a universal mount, and more particularly to a universal mount for continuous aiming of an instrument at a target object which is moving relative to the mount.

While the present invention is not confined to any specific application, it has particular utility for mounting motion picture cameras in helicopters. The mount of the present invention may also be employed to mount cameras on various other types of vehicles, including dollies in motion picture studios, and also to mount different types of instruments, such as telescopes, armament devices, and a variety of other instruments which require mounting in a manner to permit tracking of a target object which is moving relative to the mount.

It is extremely difficult for an operator to hold an instrument such as a heavy movie camera sufficiently steady to obtain pictures unblurred by involuntary movements of the operator. This problem is complicated when the operator is also required to track a moving object, or when the operator is standing or sitting upon a moving, vibrating vehicle. Consequently, various types of camera mounts have been advanced in the prior art to hold the camera steady while yet affording a means for moving the camera to track moving target objects. Such prior art mounts generally provide three axes of movement relative to a single vertical support structure so that the camera can be tipped about its optical axis, tilted in elevation, and rotated in azimuth.

Unfortunately, this arrangement does not permit the operator to remain standing or seated in one position. Instead, the operator must move with the camera as it swings from one side to another in azimuth, that is, about a vertical pan axis, and as it swings through elevation, that is, about a horizontal tilt axis. The resultant continuous movement of the operator's body is not conducive to good picture quality since such movements are usually undesirably imparted to the camera.

Accordingly, it is an object of the present invention to provide a universal mount for continuous aiming of an instrument, such as a camera, at a moving target object by utilizing spaced-apart forward and rearward supports connected together by an elongated arm or the like. The forward support mounts the camera and is operative to rotate the camera about a normally vertical forward pan axis and tilt the camera about a normally horizontal forward tilt axis. The rearward support, which mounts the arm and the forward support, is operative to rotate the elongated arm about a vertical rearward pan axis, tilt the arm about a normally horizontal rearward tilt axis, and tip the arm about a normally horizontal tip axis oriented at right angles to the rearward tilt axis. With this arrangement, for example, the operator can tilt the forward support upwardly about the forward tilt axis to track a target object, and simultaneously tilt the forward support and the elongated arm upwardly about the rearward tilt axis to thereby maintain the camera at a convenient height despite its tilted position relative to the forward tilt axis. The same is true during panning of the camera, the arrangement of the spaced-apart forward and rearward pan axes, permitting the operator to track a target object without undue shifting of his body.

Another difficulty experienced with mounts of the prior art is their inability to support heavy and unwieldy movie cameras and the like in a manner which permits an operator to move the camera with only slight effort.

Accordingly, it is another object of the present invention to provide a universal mount of the aforementioned character in which the mass of the mounted instrument is balanced about its various axes of movement. When such balance is achieved the instrument tends to remain in any position into which it is moved, which is particularly advantageous when the mount is used with a camera for taking moving pictures from a helicopter. The attitude of a helicopter often changes abruptly, and the balanced camera mounting tends to maintain the camera aimed at the target object despite the changed attitude of the helicopter, in a manner somewhat analogous to a gyroscope. Moreover the balanced arrangement of the camera permits the operator to change the position of the camera without appreciable effort, regardless of the nature of the platform, be it fixed or movable.

Another object of the invention is the provision of a universal mount for carrying a battery powered instrument such as a movie camera, with the batteries mounted on the opposite side of the rearward tilt axis to aid in balancing the mass of the camera and its associated supporting structure. In this regard, the batteries can be moved transversely, that is, located to one side of the longitudinal tip axis, to thereby facilitate balancing of the camera about yet another axis. The present invention also comprehends the use of movable weights in the battery enclosure to provide a more precise adjustment of the location of the center of gravity of the battery section.

Yet another object of the invention is to provide a universal mount of the aforementioned character which can be used not only in connection with a vibration damping support platform in a vehicle, but also in a fixed installation, as by direct mounting to the ground or to the floor of a building.

Other objects and features of the invention will become apparent from consideration of the following description taken in connection with the accompanying drawings, in which.

Figure 1:
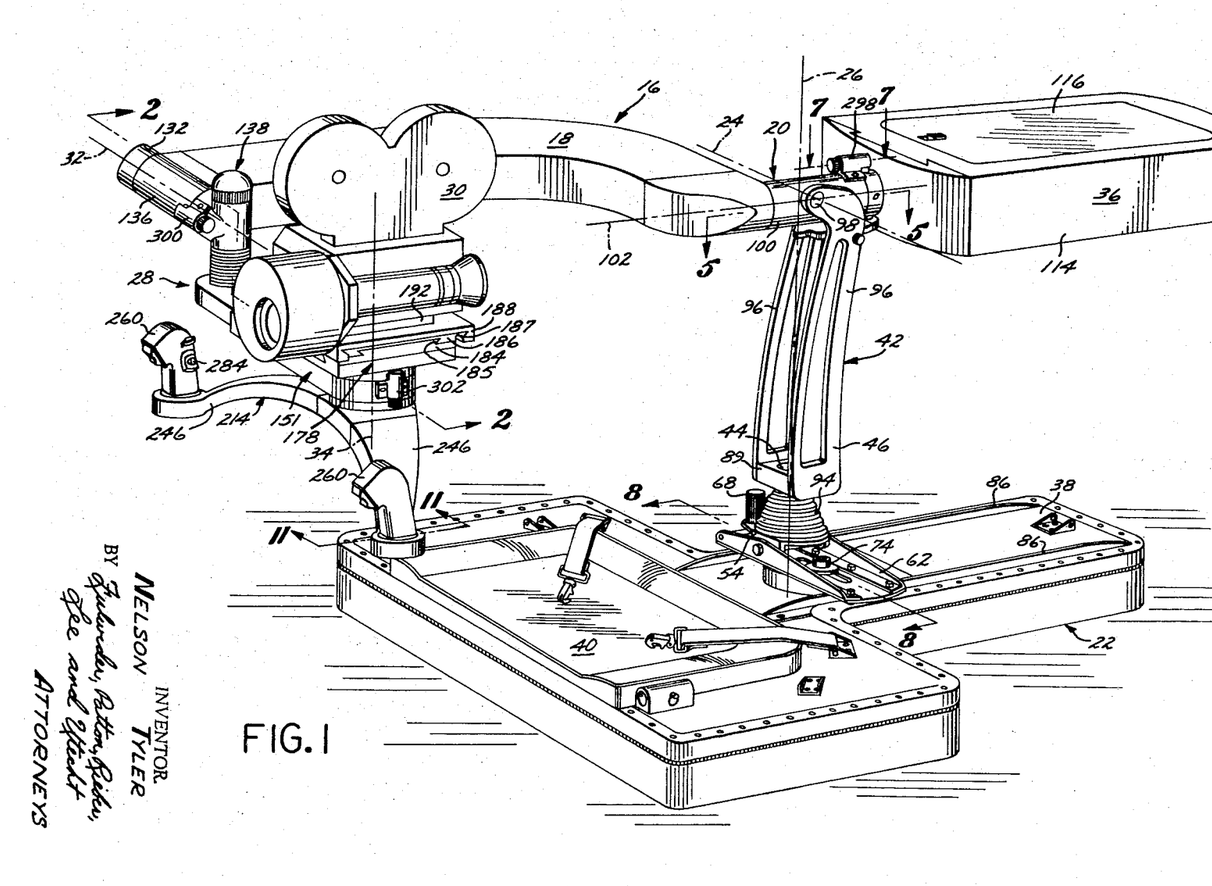
FIG. 1 is a perspective view of a universal mount according to the present invention.

Referring now to the drawings, and particularly to FIG. 1, there is illustrated a universal mount 16, according to the present invention, which is operative for continuously aiming an instrument at a target object which is moving relative to the mount 16.

*General description*

The mount 16 comprises, generally, an elongated support arm assembly 18 generally extending in a fore-and-aft or longitudinal direction; a rearward support assembly 20 connected to a supporting platform 22 and mounting the rearward extremity of the arm assembly 18 for tilting about a normally horizontal rearward tilt axis 24, and for rotation about a normally vertical rearward pan axis 26; and a forward support assembly 28 which mounts an instrument, which in the present example is a usual and conventional movie camera 30. The support assembly 28 is mounted to the forward extremity of the arm assembly 18 for tilting about a normally horizontal forward tilt axis 32, and for rotation about a normally vertical forward pan axis 34. The mount 16 also includes a balancing mass which in the present example is constituted by a battery section 36 coupled to the arm assembly 18 rearwardly of the rearward tilt axis 24.

*Supporting platform*

The particular supporting platform 22 illustrated is used with the mount 16 when it is necessary to damp out vibrations of the structure to which the platform 22 is attached. It is particularly useful when the mount is utilized in a vehicle such as a helicopter. The horizontally oriented platform 22 is secured by any suitable means (not shown) to the floor of the helicopter between the usual two side doors (not shown) so that the camera 30 can be aimed out of either door. The platform 22 is T-shaped in configuration and includes an upper plate 38 having a padded seat 40 for the camera operator.

The internal construction of the platform 22 is not a part of the present invention and therefore will be described only generally, particularly since similar forms of platform already are available in the prior art. The platform 22 includes the upper plate 38 and a similar horizontally oriented lower plate which are maintained in spaced relation by a plurality of appropriately located springs or other bias means (not shown). The edge margins of the plates are connected together by fabric or like flexible material to accommodate relative movement occurring between the plates during use of the platform 22. The springs between the plates damp vibrations of the helicopter and isolate such vibration from the upper plate 38 to which, as will be seen, the rearward support assembly 20 is mounted.

*Rearward support assembly*

The rearward support assembly 20 includes a vertically oriented post 42 which is preferably formed in two coaxial post portions 44 and 46 which are rotatable relative to each other about the rearward pan axis 26.

The lower extremity of the post lower portion 44 is received within a counterbored central opening provided in a generally cylindrical rubber mount 48, the threaded lower end of the post portion 44 extending through the mount 48 and receiving a nut 50 which secures the post portion 44 to the underside of a mount casing 52 which carries the rubber mount 48. The casing 52 includes a peripheral flange by which the casing 52 is secured to a pivot bracket 54 by a pair of nut and bolt assemblies 56. The mount 48 is sometimes referred to as a "Lord" mount and is characterized by an ability to permit the post portion 44 to tip away from its vertical axis to a limited extent, while the rubber of the mount resiliently resists such movement and also tends to isolate the post portion 44 from vibrations of the mount casing 52.

The pivot bracket 54 is characterized by a pair of depending flanges which are secured to complemental upstanding flanges 60 of a transverse bracket 62 for adjustable pivotable movement about a horizontally oriented, longitudinally extending axis.

The pivotable mounting of the bracket 54 on the transverse bracket 62 permits adjustment of the vertical orientation of the post 42 in those instances in which the supporting platform 22 is not resting upon a horizontal surface, or where the helicopter flight attitude is not such as to place the platform 22 in a horizontal position. More particularly, the pivot bracket 54 includes a lateral extension 64 having a central opening for rotatably receiving an internally threaded, vertically elongated nut 66 which is pressed within a plastic knurled knob 68.

Rotation of the knob 68 in opposite directions raises and lowers a threaded stud 70 whose upper extremity is received within the nut 66 and whose lower extremity is integral with a longitudinally extending shaft 72 pivotably carried by the flanges 60 of the transverse bracket 62. As will be apparent, the knob 68 is rotated to raise and lower the extension 64, which pivots the bracket 54 to alter the orientation of the rearward pan axis 26 relative to the vertical.

In certain applications it is important that the lateral position of the rearward pan axis also be adjustable. For example, the sometimes erratic changes in attitude of a helicopter are best isolated from the camera 30 if the rearward pan axis 26 is substantially aligned with the vertical axis of the helicopter rotor. Accordingly, the transverse bracket 62 is adapted for transverse adjustment by loosening a bolt 74 which is disposed through a transverse slot 76 in the transverse bracket 62, and through an opening in the circular top plate of a cylindrical support structure 78 which is secured to the upper plate 38 of the supporting platform 22 by a plurality of nut and bolt assemblies 80.

The bolt 74 bears upon an annular washer 81 slidable transversely over the upper surface of the transverse bracket 62, and the lower end of the bolt 74 is threaded into a nut 82 which is welded to the underside of the upper plate of the support structure 78.

The transverse bracket 62 is supported in any of its adjusted positions by the upper edges of the vertical legs of a pair of spaced-apart angle members 86 secured to the platform upper plate 38.

With the foregoing arrangement, it can be seen that the lateral position of the post 42, and consequently the lateral position of the rearward pan axis 26, is adjusted by movement of the transverse bracket 62, and the inclination of the post 42 relative to a vertical axis is adjusted by operating the knob 68.

The upper extremity of the post lower portion 44 is reduced in diameter to define an annular shoulder upon which is mounted the inner race of a thrust bearing 88, the outer race of the bearing 88 being carried by a horizontal plate 89 which forms a part of the post upper portion 46. The outer race of the bearing 88 is in communication with a central bore 90 of the portion 46 which receives the upper extremity of the post lower portion 44. Usual roller bearings 92 are also provided at the upper end of the bore 90 to reduce friction between the post portions 44 and 46.

An accordion configuration dust skirt 94 is fitted over the lower end of the post lower portion 44 and adjacent the pivot bracket 54 to keep out foreign material.

The post upper portion 46, as best viewed in FIG. 1, includes a pair of vertically elongated yoke arms 96 which are secured at their lower extremities to the sides of the plate 89. The upper extremities of the arms 96 are pivotably mounted to laterally disposed stud shafts 98 which are integral with a cylindrical sleeve 100, as best viewed in FIG. 5.

Figure 5:
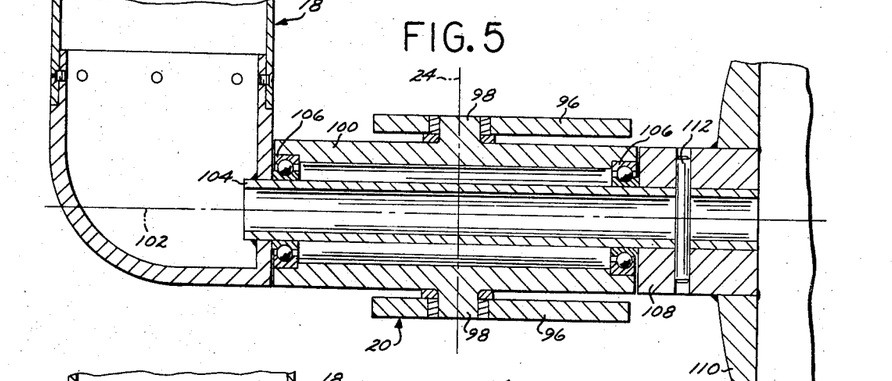
FIG. 5 is an enlarged view taken along the line 5—5 of FIG. 1.

With this arrangement, the sleeve 100 is fixed by the arms 96 against rotation about its longitudinal axis which, as will be seen, constitutes the tip axis 102 of the mount 16. However, the sleeve 100 is tiltable about the rearward tilt axis 24 by reason of the pivotal mounting of the shafts 98 to the post 42.

Rotation for the forward camera mounting structure about the longitudinal tip axis 102 is provided by an elongated sleeve 104 which is rotatably carried within the central opening in the sleeve 100 by a pair of ball bearings 106 located at opposite ends of the sleeve 100. The protruding forward extremity of the tube 104 is welded or otherwise secured to the rearward extremity of the arcuate, longitudinally elongated support arm assembly 18, and the rearward extremity of the tube 104 extends into a central opening in a cylindrical fitting 108 which is welded or otherwise secured to a battery case support 110. The support 110 and the tube 104 are secured together by a pin 112, as illustrated.

*Battery section*

Figure 9:
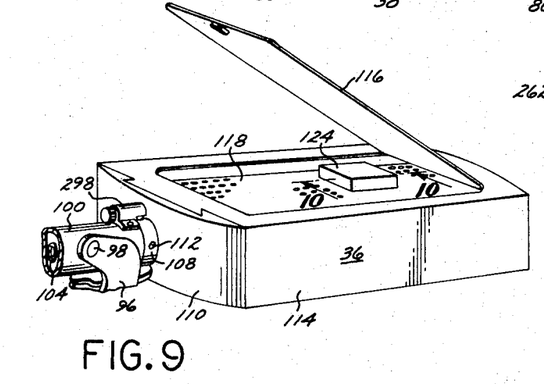
FIG. 9 is a detailed view of the battery case with its cover opened to display the movable weight.

The battery section 36 includes a hollow, generally rectangular battery case 114 provided at the top with a pivotable cover 116, as best illustrated in FIG. 9. The forward end of the case 114 includes dovetail ways which slidably mate with complemental dovetail ways provided in the rear face of the battery case support 110. In addition, the rear face of the support 110 also includes a projecting ledge or step (not shown) at the bottom of its ways to support the case 114 in operative position. This permits the case 114 to be quickly removed for substituting another battery case of different mass distribution, if desired, or to facilitate working on the components of the battery section. The hollow interior of the battery case 114 is normally made large enough to carry enough batteries to power the camera 30 over extended periods of time.

Figure 10:
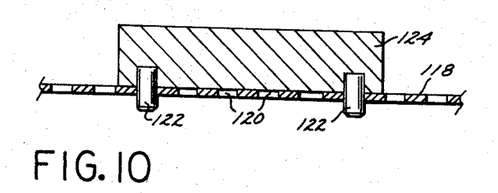
FIG. 10 is an enlarged view taken along the line 10—10 of FIG. 9.

The mass of the batteries is thus utilized to help balance pivotal movement of the mount 16 about the rearward tilt axis 24 and also, to some degree, about the tip axis 102, since the battery section 36 also tips about the axis 102. A finer adjustment of mass distribution in the battery section is provided by a horizontally oriented tray 118 which is mounted in the case 114 in overlying relation to the batteries. The tray 118 includes a plurality of openings or apertures 120, as best illustrated in FIGS. 9 and 10, which are uniformly spaced-apart in all directions to slidably receive a pair of pegs or pins 122 which are integral with a movable weight 124. With this arrangement, the weight 124 provides an additional adjustment of the location of the center of gravity of the battery section 36 by merely opening the cover 116, lifting the weight 124, and repositioning it laterally or longitudinally in one of the sets of apertures 120 to provide the best weight balance.

*Support arm assembly*

The elongated support arm assembly 18 is hollow throughout its length and from the point of its connection to the tube 104 curves laterally outwardly of the longitudinal tip axis 102. As best viewed in FIGS. 1 through 3, the forward extremity of the support arm 18 terminates in a hollow, substantially semi-cylindrical sleeve 126 which is supported by a pair of transversely spaced-apart roller bearings 128 for rotation upon a hollow shaft 130 which forms a part of a head assembly 138 which, in turn, forms a part of the forward support assembly 28. The axis of rotation of the sleeeve 126 upon the shaft 130 constitutes the forward tilt axis 32.

*Forward support assembly (head assembly)*

Figures 2, 3, 4:
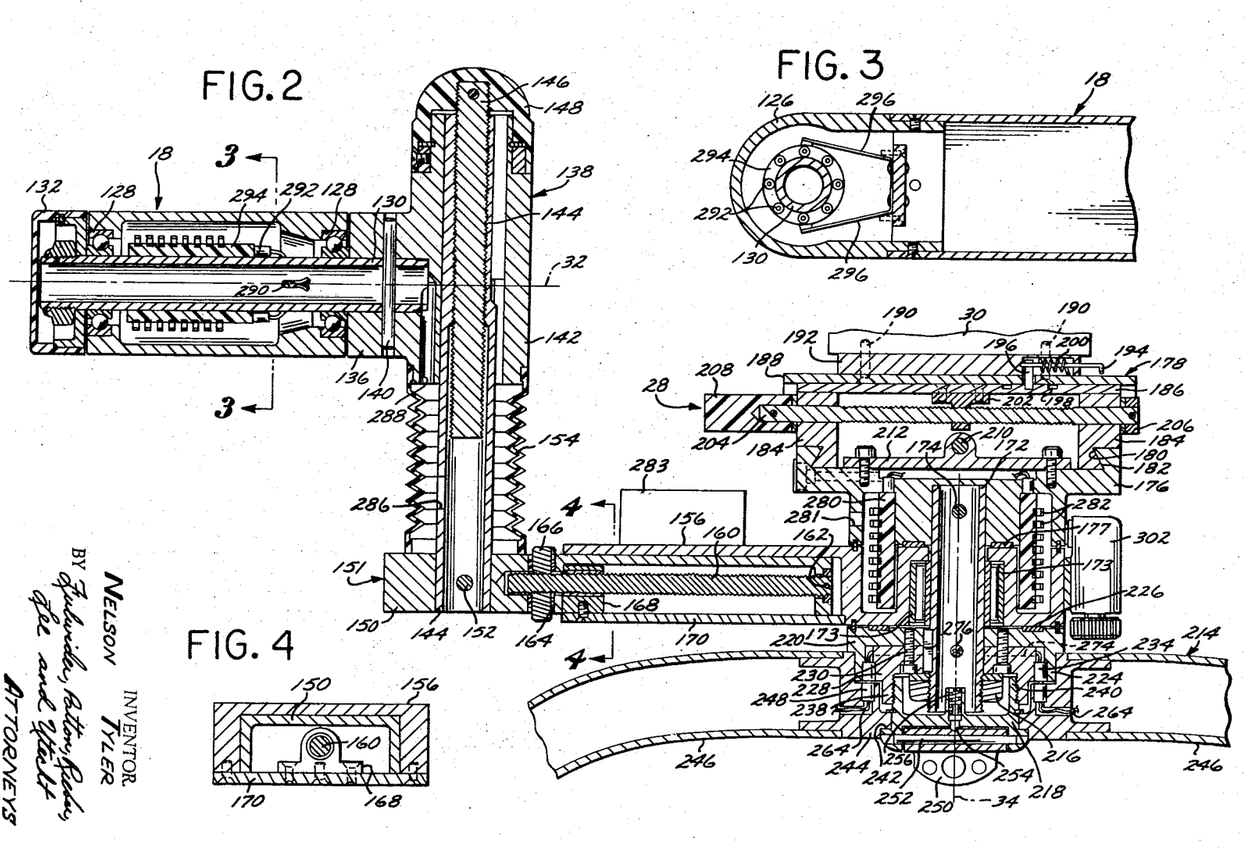
FIG. 2 is an enlarged view taken along the line 2—2 of FIG. 1.
FIG. 3 is a view taken along the line 3—3 of FIG. 2.
FIG. 4 is a view taken along the line 4—4 of FIG. 3.

A two-part hollow cap 132 is secured to the outer extremity of the shaft 130 by a nut 134 which, when tightened, urges the cap 132 against the inner race of the adjacent bearing 128 for rotation of the cap 132 with the shaft 130. The cap 132 prevents the entry of foreign material through the outer bearing 128 and into the head assembly proper.

The inner extremity of the shaft 130 extends into an opening formed in a lateral projection 136 of a head assembly body 142, and is pinned to the body 142 by a transverse pin 140.

The head assembly 138, which is operative to adjust the vertical position of the camera 30, also includes an elongated, internally threaded sleeve 144 which is vertically and slidably received within an opening in the body 142. A threaded, vertically oriented shaft 146 is disposed within the sleeve 144 and is pinned at its upper end to a knob 148 for rotation with the knob upon the upper end of the body 142. Rotation of the knob 148 in opposite directions thus raises and lowers the threaded sleeve 144 relative to the body 142.

*Forward support assembly (slider arm assembly)*

The lower extremity of the sleeve 144 extends through a vertical opening provided in a horizontally oriented, transversely extending outer slide 150 of a slider arm assembly 151. The lower end of the sleeve 144 is rigidly pinned to the outer slide 150 by a pin 152.

A vertically extensible and retractable accordion-like dust cover 154 made of rubber or the like is fitted at its base over the adjacent portion of the outer slide 150, and at its top is secured to the head assembly body 142 to keep out dirt and dust.

The slider arm 150 includes a channel-shape inner portion which telescopes within a complemental channel-shape outer portion of an inner slide 156 of the slider arm assembly 151 to permit the camera 30 to be moved laterally. This adjusts the masses of the various components of the mount 16 about the longitudinal tip axis 102 as will be seen.

As best viewed in FIGS. 2 through 4, the channel-shape inner portion of the outer slide 150 is closed at both ends by walls having openings through which a threaded, transversely extending shaft 160 is freely rotatable. The inner end of the shaft 160 is secured by a pin 162 to a thrust washer carried within a counterbore of the adjacent inner opening, and the outer end of the shaft merely rests within the blind end of the adjacent outer opening. This latter opening is in communication with a vertical slot 164 which opens through the upper and lower surfaces of the outer slide 150.

A circular adjusting knob 166 is disposed through a slot 164 and is pinned or otherwise secured to the threaded shaft 160 whereby rotation of the knob 166 freely rotates shaft 160 within the openings in the outer slide 150.

The shaft 160 is threaded through a threaded opening provided in a thrust mount 168 which is axially slidable within the hollow channel portion of the inner slide 156. The thrust mount 168 is secured to the upper surface of a slide plate 170 which closes the open lower side of the channel portion of the inner slide 156. With this arrangement, the outer slide 150 slides transversely upon the slide plate 170 and within the hollow interior of the channel portion of the inner slide 156 upon rotation of the knob 166. This alters the location of the forward pan axis 34, as will be seen.

The inner portion of the inner slide 156 is semicircular in configuration and includes a central, vertically oriented opening which rotatably receives a hollow shaft 172. Roller bearings 173 facilitate such rotation.

*Forward support assembly (tray assembly)*

The upper extremity of the shaft 172 is secured by a pin 174 within a central opening provided in the lower portion of a tray base 176 which constitutes the relatively fixed component of a tray assembly 178 which mounts the camera 30.

The lower portion of the base 176 rides upon an annular washer 177 which rests upon the adjacent upper surface of the inner slide 156. The upper portion of the base 176 includes a pair of transversely spaced-apart longitudinal upper dovetail ways 180 which longitudinally slidably receive a pair of complemental longitudinal lower dovetail ways 182 of a rectangular, centrally hollow longitudinal slide 184. The longitudinal slide 184 thus is slidable longitudinally upon the base 176.

Another slide 186 is transversely slidable upon the slide 184. As best seen in FIG. 1, the upper portion of the longitudinal slide 184 includes a pair of transversely oriented dovetail ways 185 which transversely slidably mate with complemental transverse dovetail ways of the transverse slide 186.

The upper portion of the transverse slide 186 includes another set of transversely oriented ways 187 which transversely slidably mate with dovetail ways of a camera base plate 188 which is secured by usual machine screws 190 to the base 192 of the camera 30.

The camera base 192 includes a hollow portion into which extends a pin 194 having a bent outer end constituting a handle for turning the pin about its axis. A detent 196 is fixed to the inner end of the pin 194 and normally extends through a slot provided in the plate 188 and into one of a plurality of mating grooves 198 provided in the upper surface of the transverse slide 186. A coil spring 200 is disposed about the pin 194 with one end secured within an opening in the pin 194, and the other end engaged upon the upper wall of the hollow space within which the pin 194 is disposed. This biases the pin 194 to a position in which the detent 196 is seated within one of the grooves 198. The camera 30 can be detached from the transverse slide 186 by rotating the detent 196 out of its groove 198 and transversely sliding the plate 188 off the slide 186. In addition, the camera 30 can be mounted in different transverse positions to accommodate different camera configurations, for example, or to better balance the mass of the camera about the various axes of movement, by sliding the plate 188 upon the slide 186 and locating the detent 196 in different ones of the grooves 198.

A thrust mount 202 is secured to the underside of the slide 186 and includes a threaded opening which receives a threaded, transversely oriented shaft 204. The opposite extremities of the shaft 204 are freely rotatable within openings provided in the opposite side walls of the longitudinal slide 184. A retaining collar 206 is pinned to one end of the shaft 204, and an adjusting knob 208 is pinned to the opposite end of the shaft 204 so that the shaft 204 is freely rotatable by operating the knob 208. However, the collar 206 and knob 208 constrain the shaft 204 against endwise or longitudinal movement. Consequently, rotation of the knob 208 is effective to move the slide 186 transversely, relative to the slide 184, to thereby adjust the location of the mass of the camera 30 on opposite sides of the forward pan axis 34.

In similar fashion, the longitudinal slide 184 is longitudinally adjustable by rotation of a threaded shaft 210. The shaft 210 is identical to the shaft 204 and is identically freely rotatably mounted in the front and rear walls of the longitudinal slide 184. A knob (not shown) identical to the knob 208 is rotated to rotate the shaft 210 within a threaded opening provided within a thrust mount 212 which is secured to the relatively fixed tray base 176. Thus, rotation of this knob and the knob 208 effect longitudinal and transverse adjustments of the location of the mass of the camera 30 about the forward pan axis 34 and, in conjunction with the head assembly 138, about the forward tilt axis 32.

*Forward support assembly (handle assembly)*

A handle assembly 214 is fixedly attached to a threaded lower end of the vertical shaft 172 by a nut 216 and by an externally threaded cap 218. The cap 218 includes a hollow central portion receiving the nut 216 and the lower end of the shaft 172 and, as will be seen, facilitates the engagement of pins and sockets associated with the electrical circuits for mount 16.

More particularly, the handle assembly 214 includes a member 220 having a depending annular skirt 224 and a flat upper surface adjacent the flat lower surface of the semi-circular portion of the inner slide 156. An annular thrust washer 226 is interposed between these surfaces to facilitate relative rotation between the member 220 and the inner slide 156.

A cylindrical member 228 is fitted upwardly within the hollow interior of the member 220 and is secured to the member 220 by a plurality of usual machine screws 230. For a purpose which will become apparent hereinafter, a plurality of sockets 234 are mounted in circumferential, spaced relation within the annular space between the member 228 and the adjacent skirt 224. The nut 216 bears up against the underside of the member 228 to maintain the member 228 in position against the member 220.

The member 228 includes an annular depending and internally threaded skirt 238 which is engaged upon a complemental upstanding and externally threaded skirt 240, which forms part of the cap 218, so that the cap 218 is supported by the member 228.

The cap 218 includes an annular shoulder 242 which supports a generally cylindrical handle bar mount 244 which mounts a pair of laterally extending hollow arms or handle bars 246. By threading the cap 218 into position upon the member 228, the handle bar mount 244 is also secured in position for rotation with the shaft 172 and with the tray assembly 178.

The handle bar mount 244 carries a plurality of male connectors or pins 248 which are circumferentially arranged for mating with the plurality of sockets 234. A snap ring carried by the cap 218 engages the handle bar mount 244 to carry the mount 244 downwardly when the cap 218 is unthreaded. The downward movement of the mount 244 separates it from the member 228 and disengages the sockets 234 and the pins 248 to break certain electrical circuits, as will be seen.

The cap 218 includes a finger tab 250 which can be flipped down to the position illustrated in FIG. 2 to facilitate threading and unthreading of the cap 218. The tab 250 includes an integral transversely elongated sleeve portion which carries a transverse pin 252 whose opposite ends are rotatably carried in a pair of openings provided in the adjacent walls of the cap 218. In addition, the sleeve includes a detent into which a pin 254 is receivable to orient the tab 250 in its downward position.

The pin 254 is vertically, slidably carried in the central bore of a central, upward extension of the cap 218. A pin is disposed across the open upper end of this extension and maintains a compression spring 256 in position for biasing the pin 254 downwardly into the detent in the sleeve of the tab 250. A similar detent (not shown) is located at 90 degrees to the first detent so that when the tab 250 is in its retracted or flush position the pin 254 will engage in the detent and tend to maintain the tab 250 in such retracted position.

Figure 11:
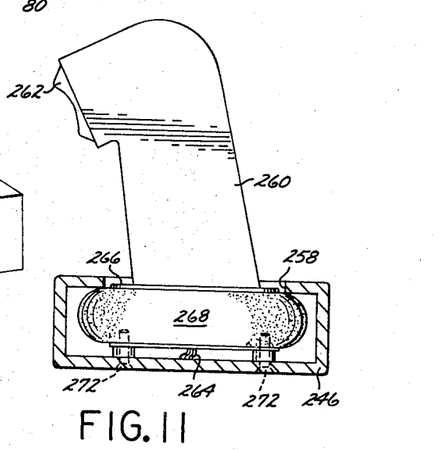
FIG. 11 is an enlarged view taken along the line 11—11 of FIG. 1.

An opening 258 is provided in the end of each of the hollow handle bars 246, and a hollow handle or grip 260 extends upwardly through each of these openings 258, as best illustrated in FIG. 11. Each handle 260 mounts one or more switches 262 which are connected through the hollow handle 260, and through the hollow handle bars 246 to the camera 30 by suitable electrical leads 264, as will be more completely described hereinafter.

The handle 260 is held in position by connection to an upper plate 266 which is adhesively or otherwise secured to a rubber shock mount 268 located inside the associated handle bar 246. A lower plate 270 is adhesively secured to the underside of the mount 268 and is itself secured to the handle bar 246 by a plurality of usual machine screws 272.

The Shore hardness of the shock mounts 268 is selected so that the mounts 268 are rigid enough to respond to deliberate control movements of the operator, to thereby manipulate the mass of the camera 30, but are soft enough to absorb inadvertent movements and vibrations of the operator. In this regard, the damping properties of the shock mounts 268 are similar to the damping properties of the rubber mount 48, the former isolating vibrations of the operator from the camera and the latter isolating vibrations of the vehicle from the camera.

*Electrical lead structure*

The particular circuitry by which the camera 30 is actuated upon operation of the switches 262, and the particular circuitry from the battery section 36 to the camera 30, are not a part of the present invention. However, the present mount 16 does afford a unique means for effecting the necessary electrical connections with a minimum of loose, hanging, or otherwise exposed electrical conduits or leads.

The electrical leads from the handle switches 262, which pass through the handles 260 and the handle bars 246, terminate in the pin connectors 248, which are engaged with the sockets 234. From the sockets 234, the electrical leads pass through cut-away channels provided at 274 in the member 228, and then into the hollow interior of the shaft 172 through an opening 276 provided in the wall of the shaft 172.

The leads then extend upwardly to a space between the upper surface of the tray base 176 and the lower surface of the thrust mount 212, and thereafter radiate outwardly to a plurality of connectors 278 arranged circumferentially within an annular groove provided in the tray base 176 and the inner slide 156.

The connectors 278 are each connected to one of a plurality of vertically spaced, circumferentially oriented slip rings which form a part of a conventional slip ring assembly 280, as will be apparent to those skilled in the art. A plurality of complemental brushes 282 which are secured in any suitable fashion to the tray base 176 and inner slide 156, ride upon the rings, and electrical leads connected to these brushes then extend out of a common passage 281 and terminate in a multi-pin plug (not shown) which plugs into a junction, relay and amplifier box 283 mounted on the top of the inner slide 156. The circuitry and components of the box 283 are not a part of the present invention, being a conventional arrangement which is responsive to the switches 260 to feed power to the camera equipment.

Other plugs (not shown) plug into the box 283 and carry electrical power leads extending to the camera motor and to the motor for the camera "zoom" lens. If desired, additional switches can be provided on the handles 260, such as indicated at 284 in FIG. 1, for operating other equipment associated with the camera 30.

A power plug (not shown) is also plugged into the box 283 and mounts electrical leads (not shown) which extend from the box 283 into the open lower end of the sleeve 144 of the head assembly 138, and then through an opening 286 provided in the wall of the sleeve 144. The leads then pass through the interior of the dust cover 154, through a passageway 288 cut in the head assembly body 142, through the inner open end of the transverse shaft 130, and outwardly through an opening 290 provided in the wall of the shaft 130.

The various leads then pass to a plurality of connectors 292 which are coupled to the slip rings of a usual and conventional slip ring assembly 294. The slip rings are rotatable with the shaft 130. The cooperating brushes 296, as best viewed in FIG. 3, are mounted to the support arm assembly portion 126, and leads (not shown) from these brushes extend through the hollow arm assembly 18 and, as best viewed in FIG. 5, next pass through the hollow interior of the tube 104 to the batteries located in the battery section 36.

By utilizing the structure just described, particularly at the points of relative movement between the various assemblies, loose loops or bundles of electrical leads are largely eliminated, thereby protecting the electrical circuitry against damage during operation of the mount 16.

*Clutch devices*

Three friction clutch devices 298, 300 and 302 are provided to adjust the degree of rotational friction present between the rear support sleeve 100 and the battery section fitting 108; between the support arm assembly portion 136 and the head assembly portion 138; and between the inner slide 156 and the tray base 176, respectively. The clutch devices can be adjusted to fix these various components against relative rotation during shipping, handling, and balancing of the mount 16, and can also be adjusted to provide a very slight frictional "drag" between the components during operation of the mount 16. A slight frictional drag has been found to give the operator better control of the aiming of the camera.

Figure 7:
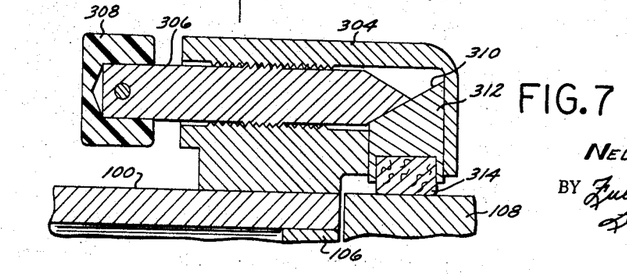
FIG. 7 is an enlarged view taken along the line 7—7 of FIG. 1.
Figure 8:
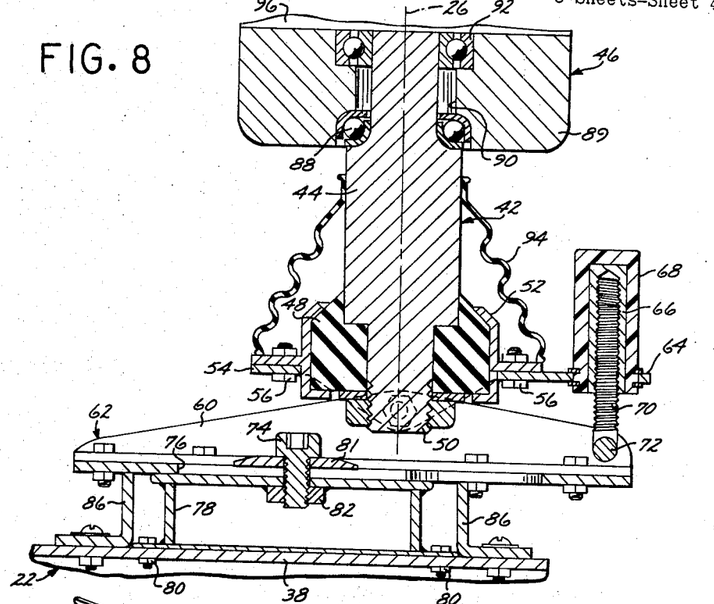
FIG. 8 is an enlarged view taken along the line 8—8 of FIG. 1.

Each of the clutch devices is identical and consequently only the clutch device 298 will be described. As best illustrated in FIG. 7, the clutch device 298 includes a body 304 which is secured in any suitable fashion to the rear support sleeve 100. The body 304 includes an internally threaded longitudinal passage which receives a threaded shaft 306 having a knob 308 secured to its outer end. The inner end of the shaft 306 is conical for engagement with the sloping surface 310 of a snubber element 312. The element 312 is mounted in the body 304 for sliding movement along an axis at right angles to the axis of the shaft 306, so that upon tightening rotation of the knob 308, the conical end of the shaft 306 is urged against the surface 310. This moves the snubber element 312 toward the battery section fitting 108, and a clutch facing 314 mounted to the element 312 frictionally engages upon the fitting 108. This adjusts the ease of relative rotation between the sleeve 100 and the fitting 108, as will be apparent.

*Balancing and operation*

Assuming that the camera mount 16 is to be used in a helicopter, the supporting platform 22 is mounted in any suitable manner to the floor of the helicopter with the seat 40 oriented forwardly so that the operator can aim the camera 30 out of either of the side doors of the helicopter. The arcuate configuration of the support arm assembly 18, together with the spaced arrangement of the forward and rearward pan axes 34 and 26, provides a space between the camera 30 and the battery section 36 in which the operator can sit.

The camera 30 is next balanced about its various axes of movement. More particularly, the three clutch devices 298, 300 and 302 are first locked. Next, the battery section 36 is slidably mounted upon the battery case support 110. The camera base plate 188 is transversely slid into position upon the transverse slide 186 and locked in position by operation of the pin 194. The camera 30 is now supported on the tray assembly 178.

The clutch devices 300 and 302 are released, and with the support arm assembly 18 maintained level, that is, in the horizontal position illustrated in FIG. 1, the operator tilts the camera 30 about the forward tilt axis 32 until it points downward, with the forward pan axis 34 horizontally oriented. The knob 206 is then operated to adjust the position of the transverse slide 186 until the mass of the camera is balanced on opposite sides of the forward pan axis 34.

Next, the operator pivots the camera 30 about the forward tilt axis 32 until it is level, with its optical axis or line of sight horizontally oriented. Knob 148 is then rotated to operate the head assembly 138 and thereby raise and lower the camera 30 relative to the forward tilt axis 32. This adjustment is continued until the mass of the camera 30 is balanced above and below the tilt axis 32.

Next, the longitudinal slide 184 of the tray assembly 178 is adjusted in a fore-and-aft direction until the mass of the camera 30 is balanced on the fore-and-aft sides of the forward tilt axis 32. It should be particularly noted that this adjustment also balances the camera mass on the fore-and-aft sides of the forward pan axis 34, since the axes 32 and 34 intersect.

The clutch device 298 is now released for balancing of the mount about the rearward tilt axis 24. The mass of the batteries in the battery section 36 should be approximately what is required to balance the mass of the camera 30 and the other items on the opposite side of the axis 24, although the weight of the batteries can be augmented by placing lead weights or the like (not shown) in the battery case 114. A precise balance of the masses of the mount 16 about the rearward tilt axis 24 is achieved by also shifting the movable weight 124 in the battery case 114.

The remaining axis about which the masses of the mount 16 must be balanced is the longitudinal tip axis 102. This adjustment is provided by rotating the knob 166 to thereby operate the slider arm assembly 151. This shifts the center of gravity of the camera 30 in a transverse direction to thereby balance the weight of the various components about the longitudinal tip axis 102. If an especially large camera is utilized, or one having a peculiar weight distribution, balance of the camera 30 about the tip axis 102 can be facilitated by altering the transverse position of the camera 30 upon the transverse slide 186, and also by adjusting the transverse position of the movable weight 124 in the battery case 114.

Operation of the mount 16 is accomplished by movement of the handles 260 in the directions necessary to pan, tilt, or tip the camera 30 so as to follow the object being photographed, as will be apparent.

Alternative battery section mounting

Figure 6:
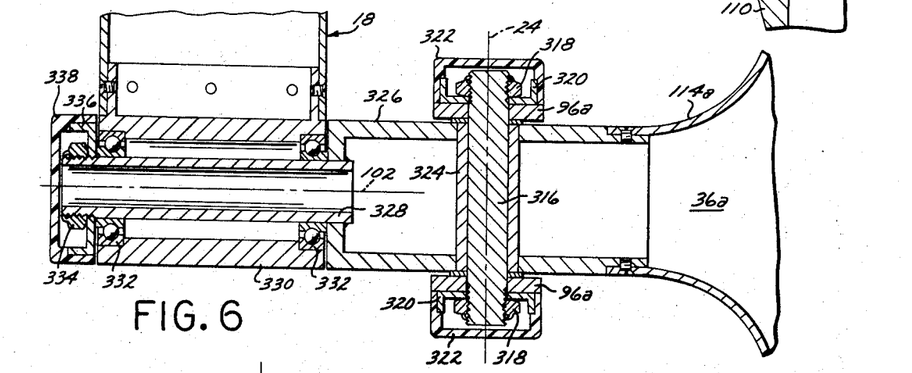
FIG. 6 is an enlarged cross-sectional view illustrating an alternative structure for mounting the arcuate arm and the battery case illustrated in FIG. 5.

It is sometimes desirable for the battery section 36 to be mounted in a manner such that it does not rotate with the support arm assembly 18. Such an arrangement is illustrated in FIG. 6, wherein like reference numerals are utilized for like parts. In this arrangement, the vertically oriented arms 96a of the rearward support assembly 20 are narrower, and include transversely aligned openings which rotatably receive a transverse shaft 316 which is threaded at its opposite extremities. The shaft 316 is secured in position upon the arms 96a by a pair of nuts 318 which bear against annular elements 320 engaged upon the outer faces of the arms 96a. A dust cap 322 is press fitted in position upon each of the annular elements 320, as illustrated.

The threaded shaft 316 is rotatably disposed through a transverse sleeve 324 which forms an integral part of a longitudinally oriented cylinder 326, the inner end of which is secured by any suitable means to a battery casing 114a. The forward extremity of the cylinder 326 includes a forward wall having a central opening which receives a tube 328 constituting a forward extension of the cylinder 326.

The end of the support arm assembly 18 in this embodiment is constituted by a cylindrical fitting 330 which is rotatably supported upon the tube 328 by a pair of longitudinally spaced-apart ball bearings 332. The fitting 330 is held in position upon the threaded forward end of the tube 328 by a nut 334 which bears against a circular element 336 which is surmounted by a dust cover 338.

With this arrangement, the support arm assembly 18 is freely pivotable about both the longitudinal tip axis 102 and the rearward tilt axis 24. However, although the battery section 36a is pivotable about the rearward tilt axis 24, it is constrained against pivotal movement about the tip axis 102. Consequently, the lateral weight distribution of the battery section 36a does not affect the balance of the camera 30 and the other mount components about the tip axis 102.

Another battery section mounting

Figure 13:
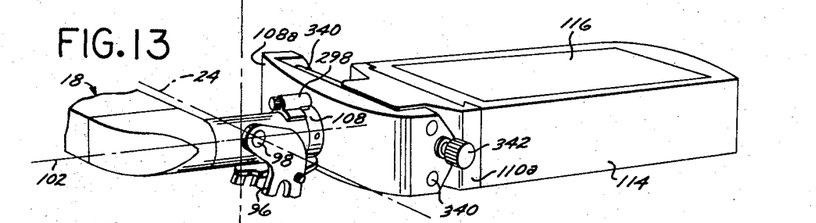
FIG. 13 is a perspective view of an alternative structure for mounting the battery case to permit lateral adjustment of the location of its center of gravity.

Referring now to FIG. 13, there is illustrated an arrangement in which the whole battery case 114 can be shifted transversely. The arrangement is identical to the mounting arrangement shown in FIG. 1 for the battery section 36 except that a battery case support 110a is utilized which includes a pair of vertically spaced transverse openings in its forward portion 110a for slidable receipt of a pair of transversely oriented shafts 340 which are rotatably carried at their opposite extremities by a fitting 108a rigidly secured to the rearward extremity of the tube 104 of the support arm assembly 18.

An adjustment knob 342 rotatably mounted to the fitting 108a is suitably threadably coupled to the support 110a so that upon rotation of the knob 342 the battery casing 114 is shifted in a transverse direction. This mounting arrangement permits the mass of the batteries and the battery casing 114 to be utilized in effecting a balance of the mount 16 about the longitudinal tip axis 102.

Another mount embodiment

Figure 12:
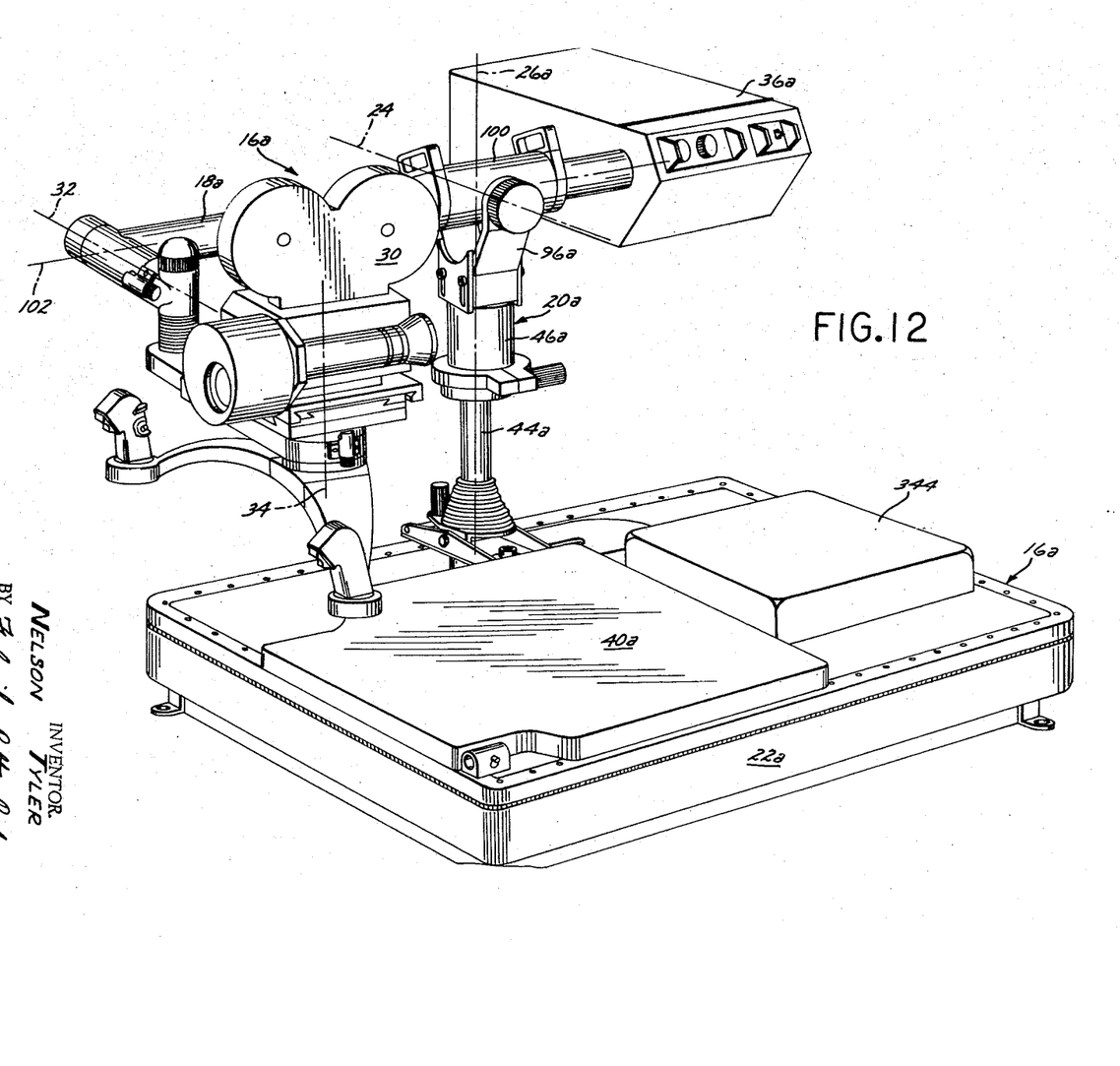
FIG. 12 is a perspective view of a second embodiment of the universal mount.

Referring now to FIG. 12, there is illustrated a mount 16a which is substantially identical to the previously described mount 16 except for the fact that the optical axis or line of sight of the camera 30 is not in substantial alignment with the tip axis 102. Such alignment is generally present with the mount 16, depending upon the mass and configuration of the camera 30, and is desirable so that tipping of the mount 16 about the axis 102 also tips the camera 30 about its own optical axis. This ideal arrangement is usually only closely approached, but in the mount 16a the optical axis of the camera 30 is deliberately offset so that the mass of the camera 30 is substantially to one side of the longitudinal tip axis 102. By virtue of this arrangement, the battery section 36a can then be transversely oriented, as illustrated in FIG. 12, to provide a more compact mount configuration for use in extremely confined spaces.

In the mount 16a certain other features are also different from the mount 16, such as the raised mounting of a seat 40a for the operator, the provision of a tool kit or box 344 on the supporting platform 22a, and a somewhat different rearward support assembly 20a. In this regard, the assembly 20a includes a cylindrical post upper portion 46a carried by the post lower portion 44a for rotation about the rearward pan axis 26, and the portion 46a includes a yoke 96a to support the sleeve 100, in a manner substantially identical to that described in connection with the mount 16.

However, the important feature of the mount 16a is the laterally offset location of the rearward support assembly to one side of the supporting platform 22a, and the utilization of a straight support arm assembly 18a to give the previously described offset relationship of the camera 30 relative to the battery section 36a. In all other important respects the mount 16a is substantially identical to the mount 16, particularly the spaced fore-and-aft location of the forward and rearward tilt axes 32 and 24, and the similar spaced relation of the forward and rearward pan axes 34 and 26a.

From the foregoing, it will be apparent that a mount has been provided which is particularly adapted for mounting a camera 30 on a helicopter in a manner effective to damp or isolate the vibrations of the helicopter from the camera 30, and in a manner which tends to maintain the camera 30 balanced about its various axes of movement so that it tends to maintain an aimed position despite the changing attitudes of the helicopter.

It will also be apparent that instruments other than the camera 30 can be mounted upon the mount and balanced in a corresponding manner. Telescopes, range finders, and armaments fall into this category, and similar applications will suggest themselves to those skilled in the art. Moreover, the present mount can be attached to a studio dolly so that the advantages inherent in the balanced camera mounting can be made available in making studio motion pictures. The sensitivity of the mount permits an operator to closely follow the movements of actors and the like.

If desired, the mount can be fixed to the ground or to a building floor or the like and operated without any vibration damping structure such as the support platform 22.

Various modifications and changes may be made with regard to the foregoing detailed description without departing from the spirit of the invention or the scope of the following claims. In the claims which follow, the terminology "horizontal," "vertical," "forward," "rearward," and like expressions have reference to the normal orientation of the mount components, as illustrated in FIG. 1. It will be apparent that such terminology is also intended to comprehend the changed attitudes of the mount components as such components are pivoted about their various axes of movement.

I claim:

1. A universal mount for continuous aiming of an instrument at a target object which is moving relative to said mount, said mount comprising:
elongated means having a forward extremity and a rearward extremity;
rearward support means adapted for connection to a supporting platform and mounting said rearward extremity of said elongated means for tilting about a normally horizontal rearward tilt axis and for rotation about a normally vertical rearward pan axis; and
forward support means adapted fo rsupporting said instrument and mounted to said forward extremity of said elongated means for tilting about a normally horizontal forward tilt axis and for rotation about a normally vertical forward pan axis whereby said forward support means can be tilted upwardly about said forward tilt axis to track a target object with said instrument, and said forward support means and said elongated means simultaneously tilted upwardly about said rearward tilt axis to maintain said instrument at a convenient height despite its tilted position relative to said forward tilt axis, said forward support means being arranged and located for substantially balancing the masses of said instrument and said forward support means about said forward tilt axis.

2. A universal mount according to claim 1 wherein said forward and rearward pan axes are generally aligned in a fore-and-aft direction, and said elongated means is laterally offset at its midportion to define a space for an operator between said forward and rearward pan axes.

3. A universal mount according to claim 1 wherein said forward support means and said elongated means are also tippable about a normally horizontally oriented fore-and-aft tip axis at right angles to said forward tilt axis.

4. A universal mount according to claim 1 and wherein said forward support means includes portions movable relative to one another to adjust the location of said instrument in a fore-and-aft direction and in a vertical direction to balance the mass of said instrument about said forward tilt axis.

5. A universal mount according to claim 4 wherein said forward tilt axis and said forward pan axis intersect, and wherein certain of said portions of said forward support means are movable relative to one another to adjust the location of said instrument in a lateral direction to balance the mass of said instrument about said forward pan axis.

6. A universal mount according to claim 1 and including a mass coupled to said rearward extremity of said elongated means and extending rearwardly of said rearward tilt axis for balancing the mass of said instrument, said forward support means, and said elongated means about said rearward tilt axis.

7. A universal mount according to claim 6 wherein said mass is rigidly coupled to said rearward extremity of said elongated means.

8. A universal mount according to claim 7 wherein said forward support means and said elongated means are also tippable about a normally horizontally oriented fore-and-aft tip axis at right angles to said forward tilt axis, and further including means operative to adjust the location of said mass in a lateral direction to balance the mass of said instrument about said tip axis.

9. A universal mount for continuous aiming of an instrument at a target object which is moving relative to said mount, said mount comprising:
elongated means having a forward extremity and a rearward extremity;
rearward support means including a vertically oriented post adapted for connection at its lower extremity to a supporting platform and further including post means connecting the upper extremity of said post to said rearward extremity of said elongated means for tilting movement of said elongated means about a normally horizontal rearward tilt axis, said post having portions movable relative to each other for rotation of said elongated means about a normally vertical rearward pan axis; and
forward support means including an instrument tray assembly for supporting said instrument,
an elongated arm having one extremity supporting said tray assembly for rotation about a normally vertical pan axis, and a head assembly connected to the other extremity of said arm and mounted to the forward extremity of said elongated means for tilting of said arm about a normally horizontal forward tilt axis whereby said arm can be tilted upwardly about said forward tilt axis simultaneously with tilting of said elongated means about said rearward tilt axis, whereby an instrument on said tray assembly can be maintained at a convenient height during tracking of an upwardly moving target object, said forward support means being arranged and located for substantially balancing the masses of said instrument and said forward support means about said forward tilt axis.

10. A universal mount according to claim 9 and including a supporting platform adapted for mounting in an aircraft and having a seat area for an operator, and further having shock absorbing means supporting said seat area and tending to isolate the operator and the tray assembly from the vibrations of the aircraft, said mount further including a universal connection between said platform and said lower extremity of said post operative to damp vibrational movements of said post away from the vertical axis along which said post is normally oriented.

11. A universal mount according to claim 9 and including a handle arm attached to said tray assembly for movement thereof about the various said axes, a pair of grips, and vibration isolating means connecting said grips to said handle arm whereby vibrations of the operator's hands tend to be isolated from the tray assembly whereas said grips impart deliberate operator hand movements to said tray assembly.

12. A universal mount according to claim 9 wherein said tray assembly includes a tray base, a laterally movable first tray section, and a longitudinally movable second tray section, said sections being movable to adjust the location of an instrument mounted upon said tray assembly in a fore-and-aft direction and in a transverse direction for balancing the mass of said instrument about said forward tilt axis and said forward pan axis.

13. A universal mount according to claim 9 wherein said head assembly is operative to adjust the location of said tray assembly and said elongated arm in a vertical direction for balancing about said forward tilt axis the mass of an instrument mounted upon said tray assembly.

14. A universal mount according to claim 9 wherein said post means is operative to permit tipping movement of said forward support means and said elongated means about a normally horizontally oriented fore-and-aft tip axis at right angles to said forward tilt axis.

15. A universal mount according to claim 10 wherein said elongated arm includes means operative to adjust the location of said tray assembly in a lateral direction for balancing about said tip axis the mass of an instrument mounted upon said tray assembly.

16. A universal mount according to claim 9 wherein said elongated means is laterally offset to locate said forward and rearward pan axes in substantial fore-and-aft alignment and define a space therebetween for an operator.

17. A universal mount according to claim 14 and including an instrument supported by said tray assembly, and further including a mass rigidly coupled to said elongated means for tipping movement therewith upon said post means and about said tip axis, and extending rearwardly of said rearward tilt axis for balancing the mass of said instrument, said forward support means, and said elongated means about said rearward tilt axis.

18. A universal mount according to claim 9 and including an instrument supported by said tray assembly, and further including a mass secured to said post means for tilting movement about said rearward tilt axis with said elongated means, said mass extending rearwardly of said rearward tilt axis for balancing the mass of said instrument, said forward support means, and said elongated means about said rearward tilt axis.

19. A universal mount according to claim 17 wherein said mass is located with its center of gravity laterally offset relative to said tip axis for balancing the mass of said instrument about said tip axis.

20. A universal mount according to claim 17 and including adjusting means operative to adjust the location of said mass in a lateral direction to balance the mass of said instrument, said forward support means, and said elongated means about said tip axis.

21. A universal mount according to claim 18 wherein said mass includes a substantially horizontally oriented, perforated tray and a weight having elements removably receivable within the perforations of said tray whereby said weight may be moved into various positions to facilitate balancing the mass of said instrument.

22. A universal mount according to claim 9 wherein said elongated means is hollow, and including an electrically operated instrument supported by said tray;
   first electrical leads therefor extending through said rearward extremity of said elongated means;
   a first set of cooperating slip rings and brushes on said arm and said tray assembly;
   a second set of cooperating slip rings and brushes on said head assembly and said elongated means;
   a hollow handle arm attached to said tray assembly for movement thereof;
   a pair of grips on said handle arm;
   switches on said grips;
   second electrical leads extending from said switches and through said handle arm to said first set of rings and brushes;
   electrical circuit means connecting said first set and said second set of rings and brushes and said instrument; and
   third electrical leads extending from said second set and through said elongated means to said first electrical leads.

23. A universal mount according to claim 1 and including a plurality of friction means engaged between those portions of said elongated means, said rearward support means, and said forward support means, respectively, which are movable relative to one another to define said rearward tilt axis, said forward tilt axis, and said forward pan axis whereby their movements about said axes are adjustably constrained to prevent overtravel relative to the target object.

24. A universal mount according to claim 3 and including a mass coupled to the rearward extremity of said elongated means and extending rearwardly of said rearward tilt axis for balancing the mass of said instrument, said forward support means, and said elongated means about said rearward tilt axis, said mass being tippable with said elongated means about said tip axis.

25. A universal mount according to claim 14 wherein the rearward extremity of said elongated means is located forwardly of said post to enable complete rotation of said elongated means about said tip axis without engaging said post.

References Cited
UNITED STATES PATENTS

| | | | |
|---|---|---|---|
| 2,599,269 | 6/1952 | Markle | 95—86 |
| 2,755,053 | 7/1956 | Sloane | 248—179 |
| 2,776,810 | 1/1957 | Paulius | 248—279 |
| 2,919,876 | 1/1960 | Plain | 248—123 |
| 3,044,346 | 7/1962 | Fieux | 95—86 X |

JOHN PETO, *Primary Examiner.*

CHANCELLOR E. HARRIS, *Examiner.*